Feb. 13, 1945.   J. R. TURNER   2,369,269
WORK FEEDING DEVICE
Filed Jan. 21, 1943   3 Sheets-Sheet 1
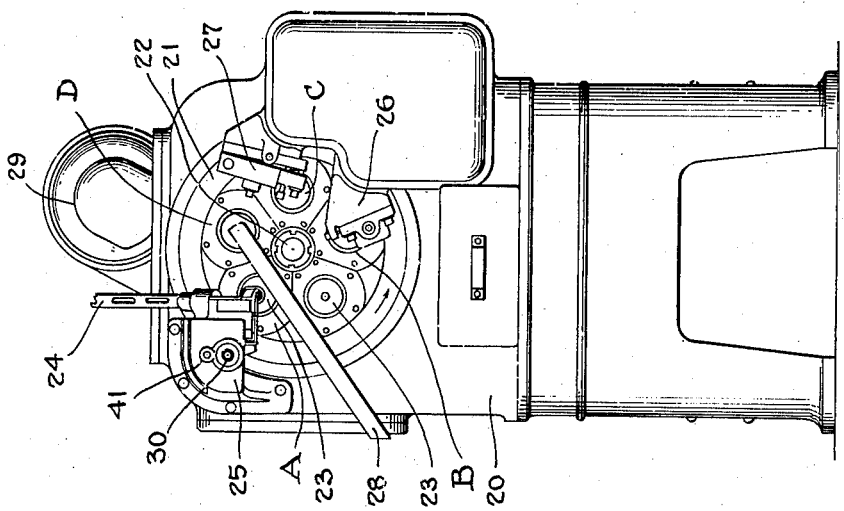
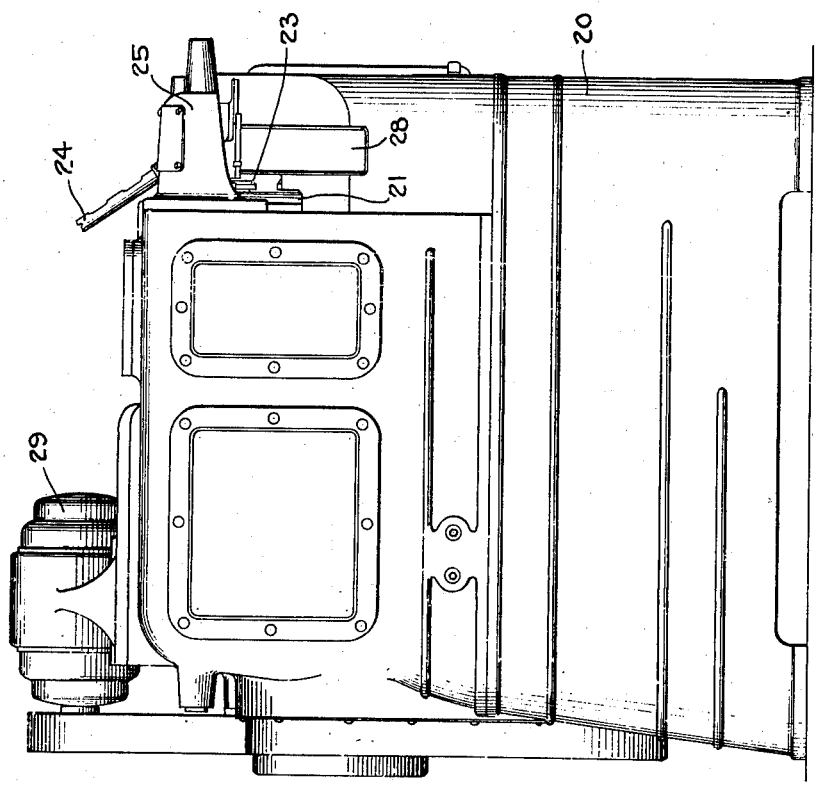
INVENTOR.
JOHN R. TURNER

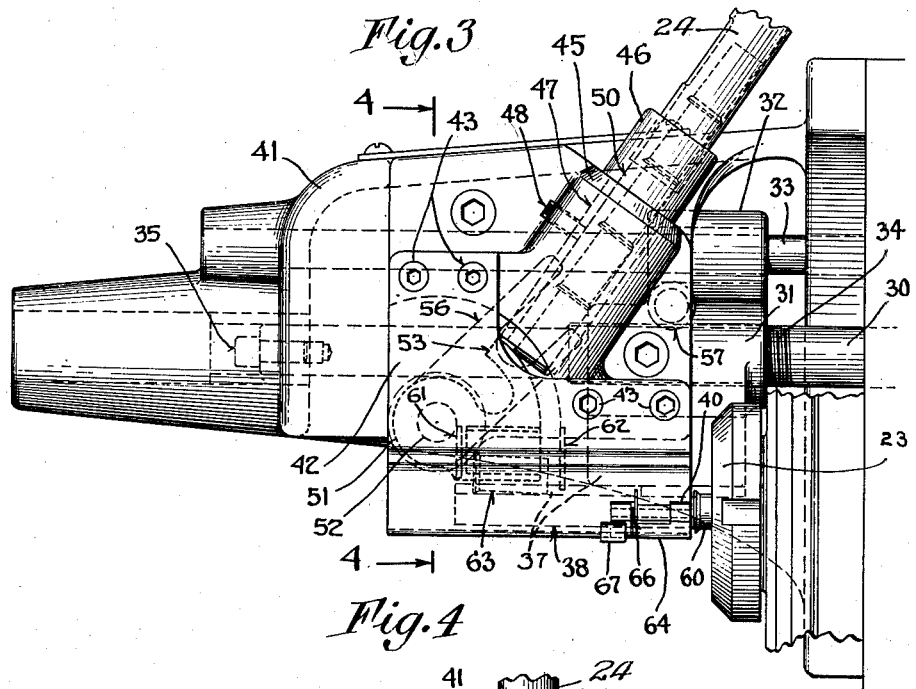
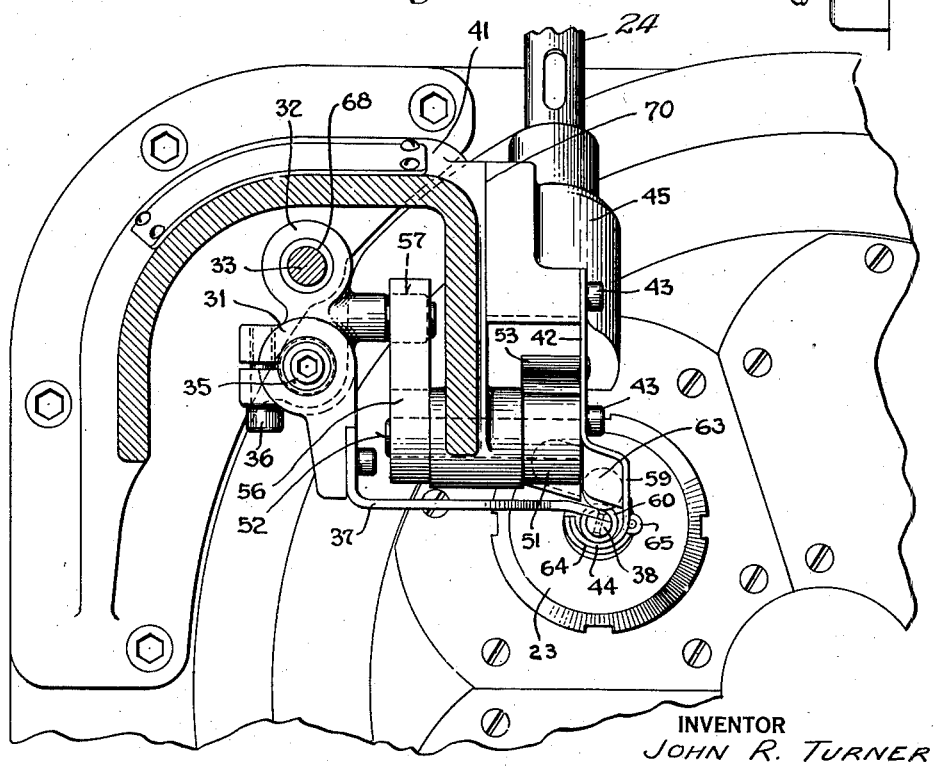

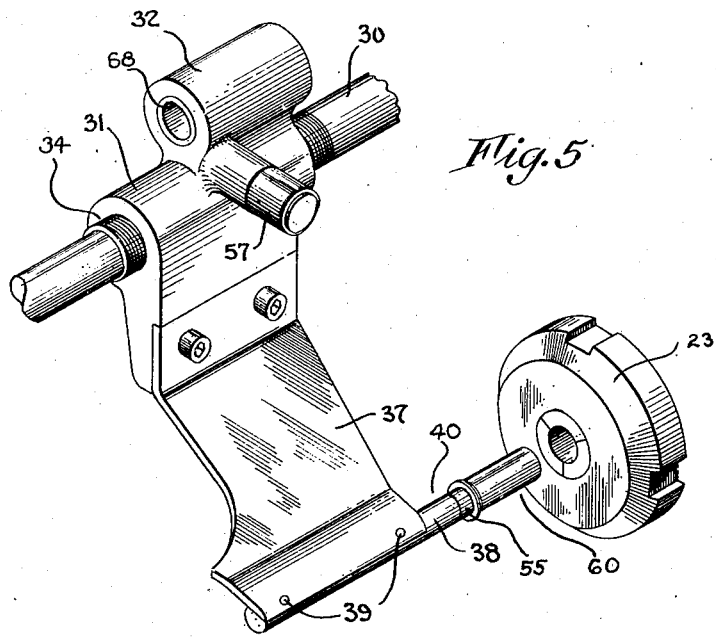
Fig. 5
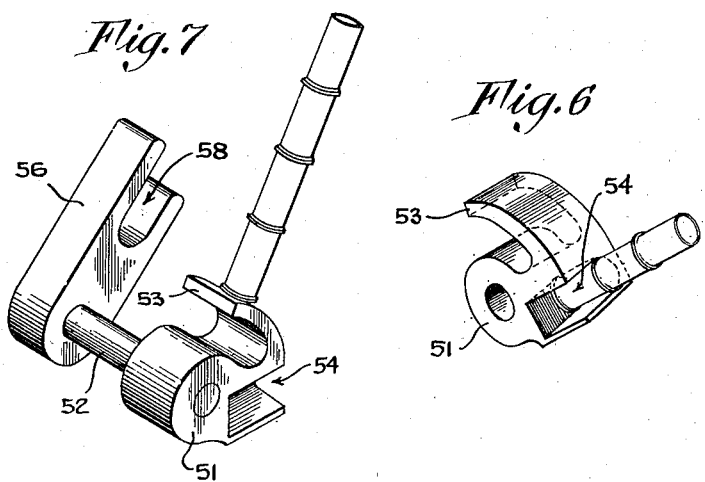
Fig. 7
Fig. 6

Patented Feb. 13, 1945

2,369,269

UNITED STATES PATENT OFFICE 2,369,269

WORK FEEDING DEVICE

John R. Turner, Milford, Conn., assignor to Remington Arms Company, Inc., Bridgeport, Conn., a corporation of Delaware Application January 21, 1943, Serial No. 473,065

8 Claims. (Cl. 29—60)

This invention relates to feed means for automatic machinery and particularly to a feed means for feeding articles such as cartridge cases to a turret type machine tool. In the operation of automatic machinery the time involved in feeding articles to the machine is in many cases a limiting factor upon the production rate of the machine and this is particularly true of tubular articles such as cartridge cases.

One of the purposes of the present invention is to provide a feed means which will operate in such a manner as to increase the rate of feed. The invention is described particularly in a turret machine having a number of work holding chucks adapted for turning the heads of cartridge cases. However, it is to be distinctly understood that the invention is not limited thereto. The other objects will become apparent from the following description and illustrations which are merely exemplary.

In the drawings:

Fig. 1 is a front elevation view of one type of machine upon which the feed may be used.

Fig. 2 is a side elevation view of the machine of Fig. 1.

Fig. 3 is an elevation view, partly in section, of the feed.

Fig. 4 is a front view partially in section of the feed shown in Fig. 3 taken along the line 4—4, with the exception that the end of the feed rod is not broken off at this section but is shown complete as though looking from the extreme left of the machine as viewed in Fig. 3.

Fig. 5 is a fragmentary perspective view of the feed rod, push rod and a collet.

Fig. 6 is a perspective view of the article carrier.

Fig. 7 is a fragmentary perspective view showing the operation of the article carrier.

Referring to Fig. 1, the frame of the machine is shown generally at 20 having a turret 21 rotatably mounted on shaft 22. Located on turret 21 are collets or chucks 23 which may be of any desired type. The chucks 23 are driven through suitable gearing in the machine. For purposes of illustration, cartridge cases will be used but the invention is applicable to other articles. A feed tube 24 feeds cases to the feeding means shown generally at 25. The turret is indexed and a case is fed into a chuck at station A. The chuck then advances until a cartridge case is at station B at which point a roughing tool, shown generally in the tool holder 26, is advanced and operates on the end and/or groove of the case. The turret at its next indexing operation brings the chuck to station C where a finishing tool shown generally at 27 may operate on the case. Station D is the ejection station at which point the collet or chuck is released and the case pushed therefrom onto delivery chute 28. The machine may have driving means at 29 to operate the various cams and parts in timed relation to perform the functions as indicated. The details of the machine are described in the copending application S. N. 484,701 filed April 27, 1943.

A reciprocating feed rod 30 is moved axially of the machine and through the connections about to be described a case is moved into the chuck at the loading station, the chuck having been opened through suitable means. A certain amount of time is required in the transfer of the case from the feed tube to a position in front of the plunger 38 (Fig. 3) for moving the case into the chuck. The present invention provides a means whereby a shell is fed into a position ready to be moved by the plunger at the next reciprocation thereof as a first shell is being moved into a chuck.

The feed rod 30 has a split bracket 31 mounted thereon, there being a screw thread connection 34 between the bracket and rod. An upwardly projecting portion 32 has a hole 68 therein for sliding engagement with the guide rod 33 so as to maintain the split bracket 31 in a predetermined position as it is reciprocated. Screw threads 34 are located on the feed rod 30. The feed rod 30 may be turned by means of a suitable wrench or screw driver operating upon adjusting nut 35 when the clamp screw 36 is loosened. In this way the position of bracket 31 on the feed rod may be longitudinally adjusted. Bracket 31 has attached thereto a horizontal bracket 37 which in turn has a plunger 38 removably mounted thereon by means of screws or fastenings 39. The chuck end 40 of the plunger may have a suitably hardened button 55 placed thereon if desired. The bracket 41 is suitably attached to the frame of the machine and has a cover plate 42 fastened thereto in any suitable manner such as by the bolts 43. The lower part of cover plate 42 is turned over in the form of a trough as seen at 44 to form a trough along which the case may be slid by the plunger 38. The bracket 41 has an enlarged portion 45 suitably shaped to receive the end of a feed tube holder 46 into which the feed tube 24 is engaged. This enlarged portion may be separate from bracket 41 to allow for easy interchange. The separation may be along line 70 for example. Enlarged portion 45 has a passageway 47 therein to receive the feed tube 46, which in turn has a passage 50 to allow the articles to slide downwardly. A set screw 48 may be provided to lock the feed tube assembly in position. The transfer member 51 is mounted on shaft 52 for oscillation in a manner about to be described.

The transfer member 51, when in the position shown in Fig. 3, blocks the passage of articles downwardly by means of the projecting portion 53 which is also shown in Fig. 7. As the transfer member is oscillated in a counterclockwise direction as viewed in Fig. 3, the aperture 54 (Figs. 6 and 7) will become aligned with the passageway 50 so that a case will be deposited therein.

The transfer member is oscillated by means of the bifurcated arm 56 fastened to shaft 52 which is operated by roller 57 mounted on the bracket 31. As the feed rod reciprocates, roller 57 will contact portion 58 of the arm 56 and oscillate the transfer member in a counterclockwise direction (Fig. 3).

As the feed rod moves again to the right, the transfer arm is moved to the position shown in Fig. 3 and a case is carried downwardly in the aperture 54 by the movement. The case is held in the aperture 54 by the cover plate 42 until it reaches its lower position. The case then rolls outwardly against portion 59 of the cover plate 42. The case may roll by gravity or may be propelled by a positive means such as a spring in the aperture if desired. When the transfer bar is in the position shown in Fig. 3, the plunger 38 is forward and acting to push a case 60 into one of the chucks 23. The case which has just been delivered against bracket 59 rests on the sloping or end portion of bracket 37 and is held from longitudinal movement by plates 61 and 62. Then during the next operation of the feed rod, the plunger and bracket 37 will move to the left as shown in Fig. 3 until the end of the plunger 38 is in such position that the case 63 can drop onto the trough portion 44 of cover plate 42. At the same time the transfer arm 51 is moving upwardly to receive another case. As the plunger moves again to the right, the case is carried on the trough 44 into the chuck which is in position in front of the plunger. As the plunger moves to the right, the transfer arm 51 is rotated in a clockwise direction to deposit another case on top of the horizontal bracket 37.

A yieldable trap door is located at 64 so that in the event a case does not go fully into the chuck the door will be operated as the turret is indexed. The door is pivoted at 65 on the cover plate 42 and is spring pressed by means of spring 66 into closed position. The stop 67 may be made integral with the door and serves to locate the main passage of the trap door 64 in line with trough 44.

Summarizing the operation of the feeding means, cases are fed downwardly in the tube 46 and pass into the aperture 54 (Fig. 6) of transfer arm 51 when the transfer arm is in its upper position. At this moment the feed rod is to the left at Fig. 3. At this same time a case located at 63 will drop onto the trough 44 because plunger 38 will have moved to the left. The case is then in position on the trough 44 to be moved to the right as the feed rod reverses its reciprocation. A case is thus moved along trough 44 into the chuck as a second case is being moved from the feed tube to a horizontal position. When the aperture of the transfer arm reaches a horizontal position the case in aperture 54 will roll by gravity out of the open side of aperture 54 onto the bracket 37. As the plunger again moves to the left a case will remain in position between plates 61 and 62 while the transfer arm moves upwardly to receive a new case. The feed rod may be adjusted so as to move the case the proper distance into the chuck 23.

When it is desired to operate on different size articles or cases the feed means may be readily changed by removing the cover plate 42 and substituting a new plunger 38 of the proper length (if necessary) and a new transfer arm 51 having the correst length and size aperture. It may also be necessary to change the cover plate 42 and trough 44 and/or the tube 24, together with enlarged portion 45 so that the passageways therein are correct for the article to be handled. It is thus seen that the device is readily adapted to use with various size articles or cartridge cases.

What is claimed is:

1. In a machine; a turret; blank holding chucks carried by said turret; blank supply means; means to transfer a blank from said supply means to said chucks including a transfer means to receive a blank from said supply means and to move said blank to a delivery position; a reciprocating plunger axially movable toward away from said chucks, said plunger having a platform integral therewith and adapted to receive a blank from said delivery position; means to limit longitudinal movement of said blank while on said platform; and means to reciprocate said plunger and platform beyond the longitudinal limiting means so that the blank can move to a position in front of the plunger and thereby be carried into a chuck.

2. In a machine; a turret; blank holding chucks carried by said turret; a longitudinally reciprocating plunger movable toward and away from said chucks; a reciprocating operating rod; blank supply means; a bracket connecting said plunger and rod; oscillating transfer means to move a blank from said supply means to said bracket; means to limit longitudinal movement of said blank while on the bracket; and means to operate said oscillating transfer means and rod in timed relation, said plunger being moved thereby beyond the longitudinal limiting means so that the blank on the bracket will move into the path of the plunger and be carried into a chuck on the next reciprocation of the plunger.

3. In a machine; a turret; blank holding chucks carried by said turret; a longitudinally reciprocating plunger movable toward and away from said chucks; a reciprocating operating rod; blank supply means; a bracket adjustably connecting said plunger and rod; oscillating transfer means to move a blank from said supply means to said bracket; means to limit longitudinal movement of said blank while on the bracket; and means to operate said oscillating transfer means and rod in timed relation, said plunger being moved thereby beyond the longitudinal limiting means so that a blank on the bracket can move into the path of the plunger and be carried into a chuck on the next reciprocation of the plunger.

4. In a machine; a turret; blank holding chucks carried by said turret; blank supply means; a longitudinally reciprocating plunger; a trough below the path of movement of said plunger; said trough extending to a point adjacent the chucks; a yieldable door at the chuck end of said trough; an apertured oscillating transfer means to receive blanks and move the same from said supply means to a position adjacent to and above the path of movement of said plunger; means to limit the longitudinal movement of a blank at said delivery point until the work has moved by gravity from a position adjacent said plunger to a position in front of said plunger; and means to reciprocate the plunger toward a chuck and to a return point beyond the longitudinal limiting means so that a blank can move onto the trough and be transferred to a chuck by said plunger.

5. In a device for feeding blanks to a chuck machine readily transformable to feed blanks of varying size, the combination comprising a turret; blank supply means; blank holding chucks carried by said turret; a removably mounted reciprocating plunger longitudinally movable toward and away from said chucks; a removably mounted cover plate having a trough extending below the path of movement of said plunger; a readily removable apertured oscillating transfer means for receiving blanks from said supply means and delivering same to a point adjacent to and above the path of movement of said plunger, said cover plate cooperating with said aperture to hold a blank in said transfer means until the delivery point is reached; a readily removable longitudinal movement limiting means to limit longitudinal movement of a blank at said delivery point until the blank has moved by gravity to a position in front of the plunger; and means to reciprocate the plunger to a chuck and to a return point beyond the longitudinal limiting means so that the blank can move onto said trough and be transferred to a chuck by reciprocation of said plunger.

6. In a machine, a turret; blank holding chucks carried by said turret; blank supply means; an oscillating transfer member having a slot opening radially and sidewise, said transfer member receiving blanks radially from the supply means through said radial opening and delivering the blank sidewise by gravity from said side opening at a delivery point remote from said supply means, and a reciprocating plunger operable to engage the blank after it has moved sidewise and in front of said plunger to move the blank into a chuck.

7. In a machine, a turret; blank holding chucks carried by said turret; blank supply means; an oscillating transfer member having a slot opening radially and sidewise, said transfer member having a portion cooperating with the supply means to prevent delivery of blanks from the supply means unless the aperture is aligned therewith, said transfer member receiving a blank through the radial opening and delivering a blank sidewise by gravity from the side opening at a delivery point; a reciprocating plunger operable to engage the blank after it has moved sidewise and in front of said plunger and move the blank into a chuck; and means to move said transfer means and a blank therein from said supply means at the same time said plunger is moving another blank into a chuck.

8. In a machine; a turret; blank holding chucks carried by said turret; blank supply means; a reciprocating plunger axially movable toward and away from said chucks; a trough below the path of movement of said plunger; an apertured oscillating transfer means for receiving a blank in an aperture thereof from said supply means and delivering the same to a point directly adjacent the path of movement of said plunger; means at said delivery point above said trough to limit the longitudinal movement of a blank at said delivery point until the work has moved to a position in front of the plunger on the trough; means to reciprocate the plunger toward a chuck and to a return point beyond the longitudinal limiting means so that a blank can move onto the trough and be transferred to a chuck by said plunger; and means to operate said transfer means in time with said plunger to move a blank from the blank supply means as another blank is being moved toward the chuck.

JOHN R. TURNER.